(12) United States Patent
Tzanetakis et al.

(10) Patent No.: US 9,411,884 B1
(45) Date of Patent: *Aug. 9, 2016

(54) NOISE BASED INTEREST POINT DENSITY PRUNING

(71) Applicant: Google Inc., Mountain View, CA (US)

(72) Inventors: George Tzanetakis, Victoria (CA);
Dominik Roblek, Kilchberg ZH (CH);
Matthew Sharifi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/325,115

(22) Filed: Jul. 7, 2014

Related U.S. Application Data

(63) Continuation of application No. 13/276,318, filed on Oct. 18, 2011, now Pat. No. 8,805,560.

(51) Int. Cl.
*G06F 17/00* (2006.01)
*G06F 17/30* (2006.01)

(52) U.S. Cl.
CPC .... *G06F 17/30743* (2013.01); *G06F 17/30758* (2013.01)

(58) Field of Classification Search
CPC .............. G06F 17/30743; G06F 17/30758; G06F 17/30017; G10L 15/02; G10L 15/20; G10L 25/48; G10L 15/265; G10L 19/018; G06K 9/00523; Y10S 707/99945
See application file for complete search history.

(56) References Cited

U.S. PATENT DOCUMENTS

| 4,852,181 | A | 7/1989 | Morito et al. |
| 5,313,555 | A | 5/1994 | Kamiya |
| 6,453,252 | B1 | 9/2002 | Laroche |
| 6,721,488 | B1 | 4/2004 | Dimitrova et al. |
| 7,516,074 | B2 | 4/2009 | Bilobrov |
| 7,809,580 | B2 | 10/2010 | Hotho et al. |
| 8,411,977 | B1 | 4/2013 | Baluja et al. |
| 2002/0023020 | A1 | 2/2002 | Kenyon et al. |
| 2005/0071157 | A1 | 3/2005 | Droppo et al. |
| 2006/0190450 | A1 | 8/2006 | Holm et al. |
| 2009/0012638 | A1 | 1/2009 | Lou |

OTHER PUBLICATIONS

MusicBrainz—The Open Music Encyclopedia, http://musicbrainz.org, Last accessed Apr. 12, 2012.
Shazam, http://www.shazam.com, Last accessed Apr. 19, 2012.
(Continued)

*Primary Examiner* — Curtis Kuntz
*Assistant Examiner* — Thomas Maung
(74) *Attorney, Agent, or Firm* — Fenwick & West LLP (57) ABSTRACT

Systems and methods for noise based interest point density pruning are disclosed herein. The systems include determining an amount of noise in an audio sample and adjusting the amount of interest points within an audio sample fingerprint based on the amount of noise. Samples containing high amounts of noise correspondingly generate fingerprints with more interest points. The disclosed systems and methods allow reference fingerprints to be reduced in size while increasing the size of sample fingerprints. The benefits in scalability do not compromise the accuracy of an audio matching system using noise based interest point density pruning.

20 Claims, 9 Drawing Sheets

(56) References Cited

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed Jul. 11, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

Office Action for U.S. Appl. No. 13/276,318, dated Jul. 12, 2013, 28 pages.

Office Action for U.S. Appl. No. 13/276,318, dated Jan. 17, 2014, 23 pages.

Notice of Allowance for U.S. Appl. No. 13/276,318, dated Apr. 7, 2014, 28 pages.

NOISE BASED INTEREST POINT DENSITY PRUNING

CROSS-REFERENCE TO RELATED CASES

This application is a continuation of U.S. patent application Ser. No. 13/276,318, filed Oct. 18, 2011, and entitled, "NOISE BASED INTEREST POINT DENSITY PRUNING," the entirety of which is incorporated herein by reference.

TECHNICAL FIELD

This application relates to audio matching, and more particularly to noise based interest point density pruning for fingerprinting.

BACKGROUND

Audio samples can be recorded by many commercially available electronic devices such as smart phones, tablets, e-readers, computers, personal digital assistants, personal media players, etc. Audio matching provides for identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Fingerprints or descriptors can be computed as functions of sets of interest points. Fingerprints of the audio sample can then be compared to fingerprints of reference samples to determine identity of the audio sample.

When comparing the fingerprint of an audio sample to fingerprints of reference samples, it is desirable to have a database containing enough reference samples to make the comparison. The audio sample could come from any of a large number of sources, and be of any of a variety of content types (e.g., from music, from a movie, or from a television show). Consequently, a database of reference samples that contains sufficient music samples, movie samples, and television samples to afford for accurate matching could contain millions of samples.

As reference fingerprints are computed as functions of sets of interest points, the more interest points present in an individual reference fingerprint, the larger the fingerprint becomes. Thus, a database of a plurality of reference sample fingerprints consisting of large amounts of interest points negatively affects scalability in terms of storage and index size for an audio matching system.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. A noise detection component can determine a noise level in an audio sample. An interest point detection component can generate a set of interest points for the audio sample. A density component can generate subsets of interest points based on the set of interest points. A fingerprint component can generate a set of fingerprints based on the subsets of interest points and the noise level.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. One manner to identify unique characteristics of an audio sample is through use of a spectrogram. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can require large amounts of storage space and affect scalability of an audio matching system. Therefore, it is desirable to instead calculate and store compact descriptors ("fingerprints") of reference samples versus an entire spectrogram. One method of calculating fingerprints is to first determine individual interest points that identify unique characteristics of local features of the time-frequency representation of the reference sample. Fingerprints can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of onset of a note. It is to be appreciated that conceivably any suitable spectral event over a specific duration of time could constitute an interest point.

An audio matching system that includes reference fingerprints with many interest points is generally more accurate in identifying an audio sample. For example, the more interest points in a reference sample fingerprint, the more likely an interest point from a fingerprint of an audio sample will match an interest point from the reference sample fingerprint. However, adding additional interest points to each reference sample fingerprint can limit scalability of the system. For example, because fingerprints are calculated as functions of sets of interest points, the size of a fingerprint can be dependent on the number of interest points contained in the fingerprint.

While the size of reference fingerprints can limit scalability of an audio matching system, the size of an audio sample fingerprint does not similarly limit scalability. This is because audio sample fingerprints are not permanently stored in the reference fingerprint database; rather, audio sample fingerprints are used to match the sample and then can be discarded. Accordingly, audio sample fingerprints containing large amounts of interest points can involve additional lookups against the reference fingerprint database but not necessarily additional data storage. It can be appreciated that additional lookups may also require additional computational power to process the extra results.

Therefore, one means of increasing scalability of an audio matching system would be to limit the amount of interest points in reference sample fingerprints while increasing the amount of interest points in audio sample fingerprints.

For samples suffering from noise or distortion, including additional interest points in sample fingerprints can be beneficial in matching the sample fingerprint to a reference fingerprint as some interest points in the sample fingerprint may suffer from effects of noise or distortion making those interest points unmatchable to the interest points in the reference fingerprint. In addition, the sample may contain types of noise which cause new interest points to be created. For example, someone talking over an audio sample can create sample fingerprints with both irrelevant interest points generated based on the talking along with relevant interest points generated based on the underlying audio sample. In this example, including additional interest points in the sample fingerprint can offer better performance as the more relevant interest points within the sample fingerprint the more efficiently an audio matching system can match the sample fingerprint to reference fingerprints.

For samples that have little noise or distortion, including additional interest points in the sample fingerprint may be unnecessary as clean samples are generally more easily matched to reference samples. While including additional interest points in clean sample fingerprints may negligibly increase matching accuracy, it also increases computational demands in processing additional lookups against the reference fingerprint database. Therefore, it is advantageous to limit including additional interest points in sample fingerprints when the sample contains little noise or distortion.

Systems and methods herein provide for including greater amounts of interest points in sample fingerprints than in reference fingerprints. The amount of interest points to include in sample fingerprints can be based on the amount of noise in the sample. Noisier samples can include more interest points in the sample fingerprint. Thus, the system can reduce the storage footprint required for reference sample fingerprints while still maintaining accurate identification of audio sample.

As discussed in greater detail below, various implementations provide for using noise based interest point density pruning methods to improve both audio matching performance and scalability. In one implementation, interest points can be pruned by selecting a subset of interest points from a set of interest points. In addition, in a high noise environment, subsets with a higher density of interest points or the entire set of interest points can be selected to increase audio matching accuracy.

Figure 1:
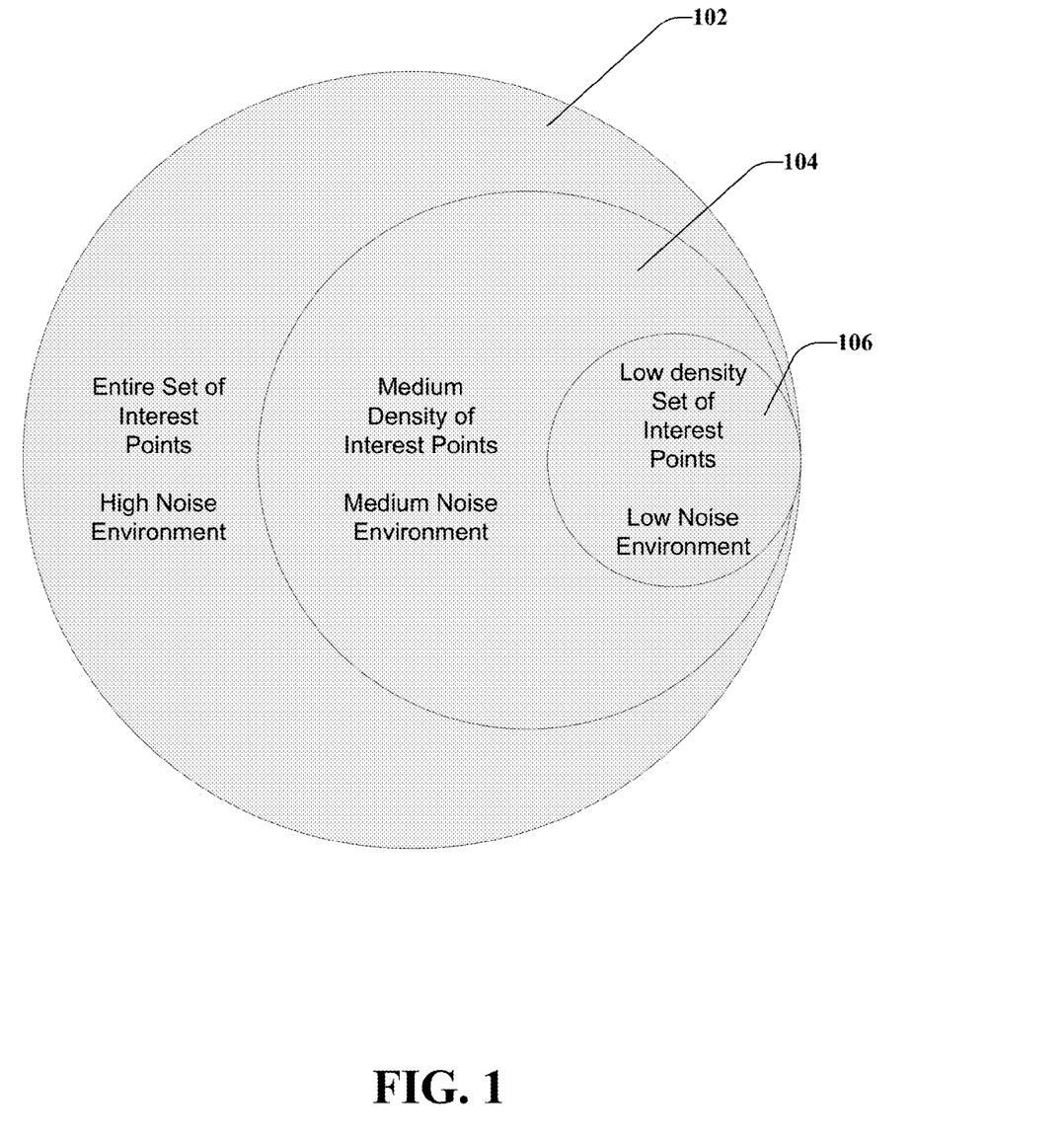
FIG. 1 illustrates a graphical diagram example of noise based interest point pruning.

Referring initially to FIG. 1, there is illustrated a graphical example of noise based interest point pruning. An audio sample (not shown) can be run through a plurality of interest point detection methods (not shown) to generate an entire set of interest points 102. If high amounts of noise are detected in the audio sample, the audio matching system can use the entire set of interest points 102 in an attempt to match the audio sample with reference samples.

Set 104 represents a subset of the entire set of interest points 102. For example, when medium amounts of noise is detected in the audio sample, a subset 104 of the entire set of interest points 102 can be used in an attempt to match the audio sample.

Set 106 represents a subset of set 104 and 102 respectively. In a low noise environment, it is more likely that any interest point from the audio sample will match a corresponding interest point in a reference sample. Accordingly, in a low noise environment, even less than the subset 104 of the entire set of interest points 102 can be used to effectively match the audio sample.

It can be further appreciated that sets 102, 104, and 106 are to illustrate aspects of the subject disclosure and do not limit the amount of possible sets used to distinguish various noisy environments. For example N subsets of 102 (N is an integer) can be used to distinguish varying levels of interest points used in matching the audio sample to reference samples. Additionally, the relative size of 102 compared to 104 compared to 106 in FIG. 1 is illustrative only.

Figure 2:
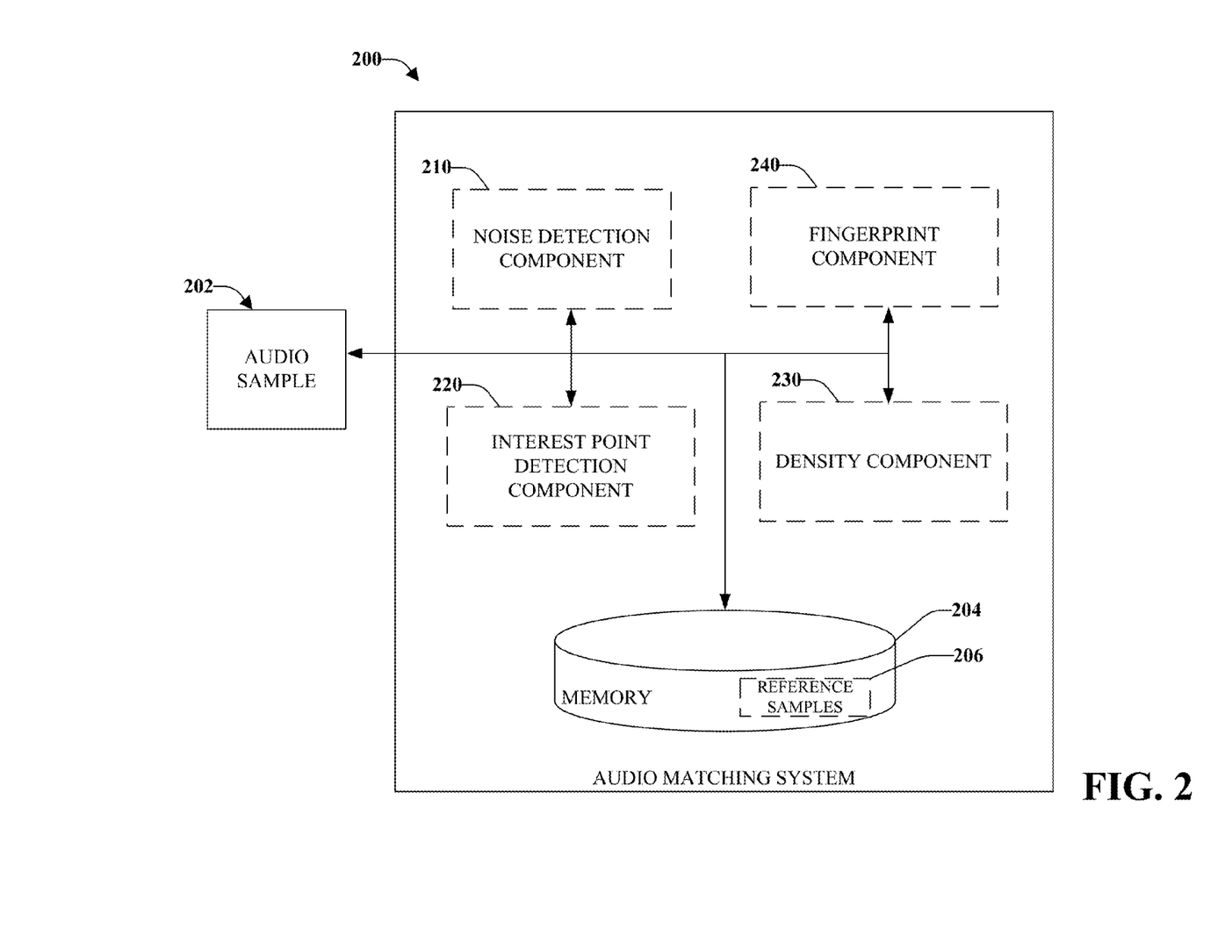
FIG. 2 illustrates a high-level functional block diagram of an example audio matching system.

FIG. 2 illustrates a high level functional block diagram of a non-limiting example noise based interest point density pruning system 200. Noise detection component 210 can determine a noise level in the audio sample 202. For example, the audio sample can be analyzed for presence of spectral activity in frequencies inaudible to people in an attempt to detect noise. In yet another example, a dynamic threshold in the time-frequency domain can be determined where spectral events that meet such threshold can be indicative of noise. For example, spectral events indicative of audio compression techniques, pitch shifting, or time stretching can be determined and incorporated into the dynamic threshold.

In one implementation, a noise level can be determined based upon source of the audio sample. For example, audio samples originating from a device expected to have recorded the audio sample, e.g., a phone, personal digital assistant, or a tablet device, can be indicative of noisier environments. Audio samples from a device expected to primarily deliver or transmit audio from storage, e.g., from a server, personal computer, or media player can be indicative of a noise free environment.

To provide for or aid in the numerous inferences described herein, components described herein can examine the entirety or a subset of data available and can provide for reasoning about or infer states of a system, environment, and/or client from a set of observations as captured via events and/or data. Inference can be employed to identify a specific context or action, or can generate a probability distribution over states, for example. The inference can be probabilistic—that is, the computation of a probability distribution over states of interest based upon a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Interest point detection component 220 can generate a plurality of sets of interest points based upon audio sample 202. It can be appreciated that sets of interest points corresponding to different types of spectral events can be generated to maximize the diversity of interest points included in the set of interest points generated by interest point detection component 220.

Density component 230 can generate subsets of interest points based on the set of interest points. It can be appreciated that subsets of interest points can be based on interest point detection methods, random selection, or using a trained classifier. For example, density component 230 can generate a subset of interest points based on interest point detection methods most robust to pitch shift distortion. In another example, density component 230 can generate a subset of interest points based on interest point detection methods most robust to noise introduced by compression techniques.

It can be further appreciated, as discussed in greater detail below with regard to fingerprint component 240 that using subsets of interest points to generate a fingerprint can prune interest points from the entire set of interest points generated by interest point detection component 220.

Fingerprint component 240 can generate a set of fingerprints based on the subsets of interest points and the noise level. In one implementation, fingerprint component 240 increases the amount of interest points in the set of fingerprints as the noise level increases. It yet another implementation, the amount of interest points in the set of fingerprints can be determined by a trained classifier. For example, if the noise level is indicative of pitch shift distortion, fingerprint component 240 can generate a set of fingerprints based on a subset of interest points most robust to pitch shift distortion. In another example, if the noise level is indicative of pitch shift distortion and noise introduced by compression techniques, fingerprint component 240 can generate a set of fingerprints based on a subset of interest points most robust to pitch shift distortion and noise introduced by compression techniques.

Figure 3:
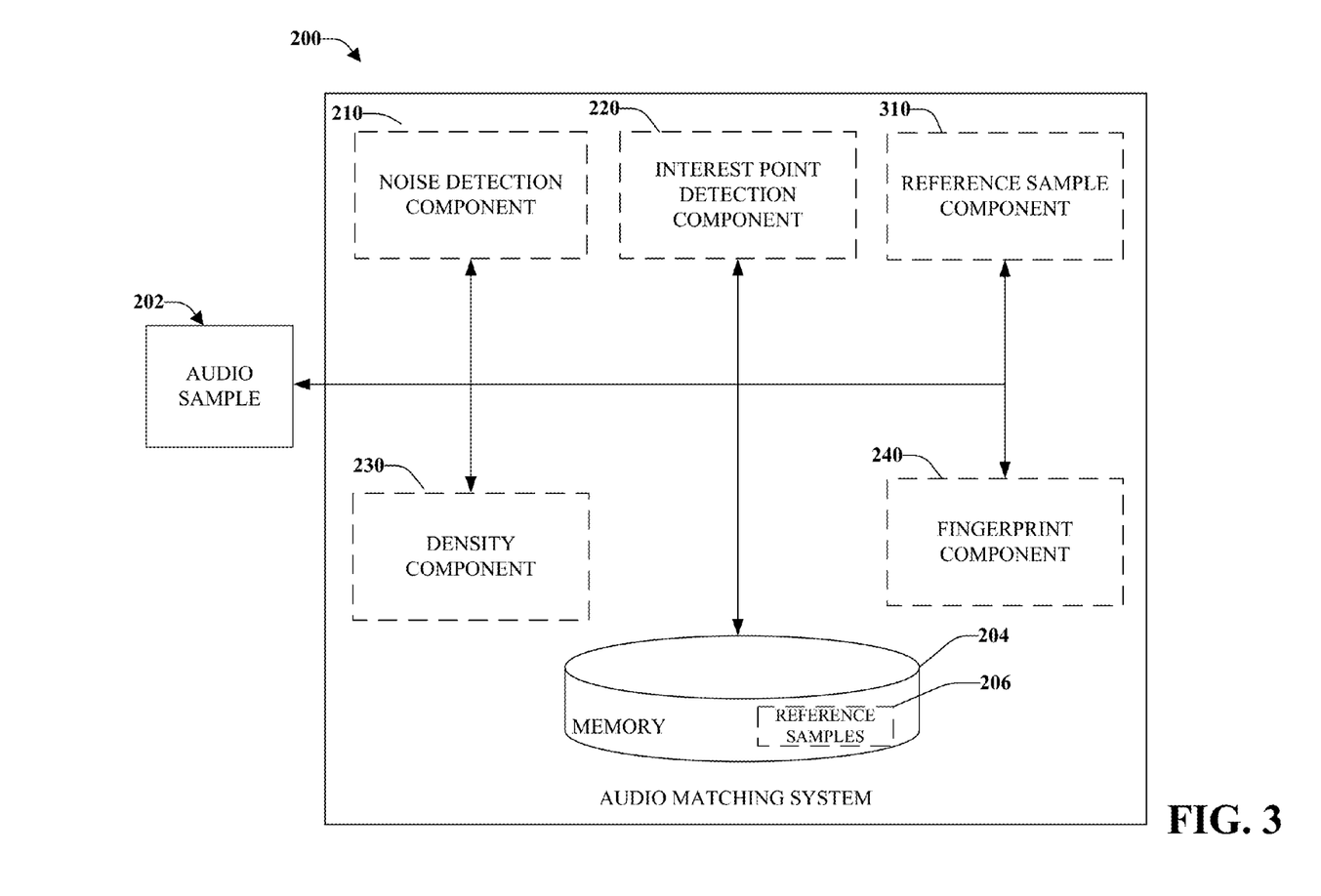
FIG. 3 illustrates a high-level functional block diagram of an example audio matching system using a reference sample component.

Referring now to FIG. 3, illustrated is a high-level functional block diagram of an example audio matching system 200 including reference sample component 310 that can determine amount of interest points included within the fingerprints of reference samples 206 stored in memory 204. It can be appreciated that a plurality of fingerprints for a plurality of reference samples 206 can be stored in memory 204 for access by system components.

In one implementation, fingerprint component 240 generates a set of fingerprints based on the amount of interest points within fingerprints of reference samples 206. The amount of interest points in the set of fingerprints generated by fingerprint component 240 can be greater than the amount of interest points within fingerprints of reference samples 206.

Figure 4:
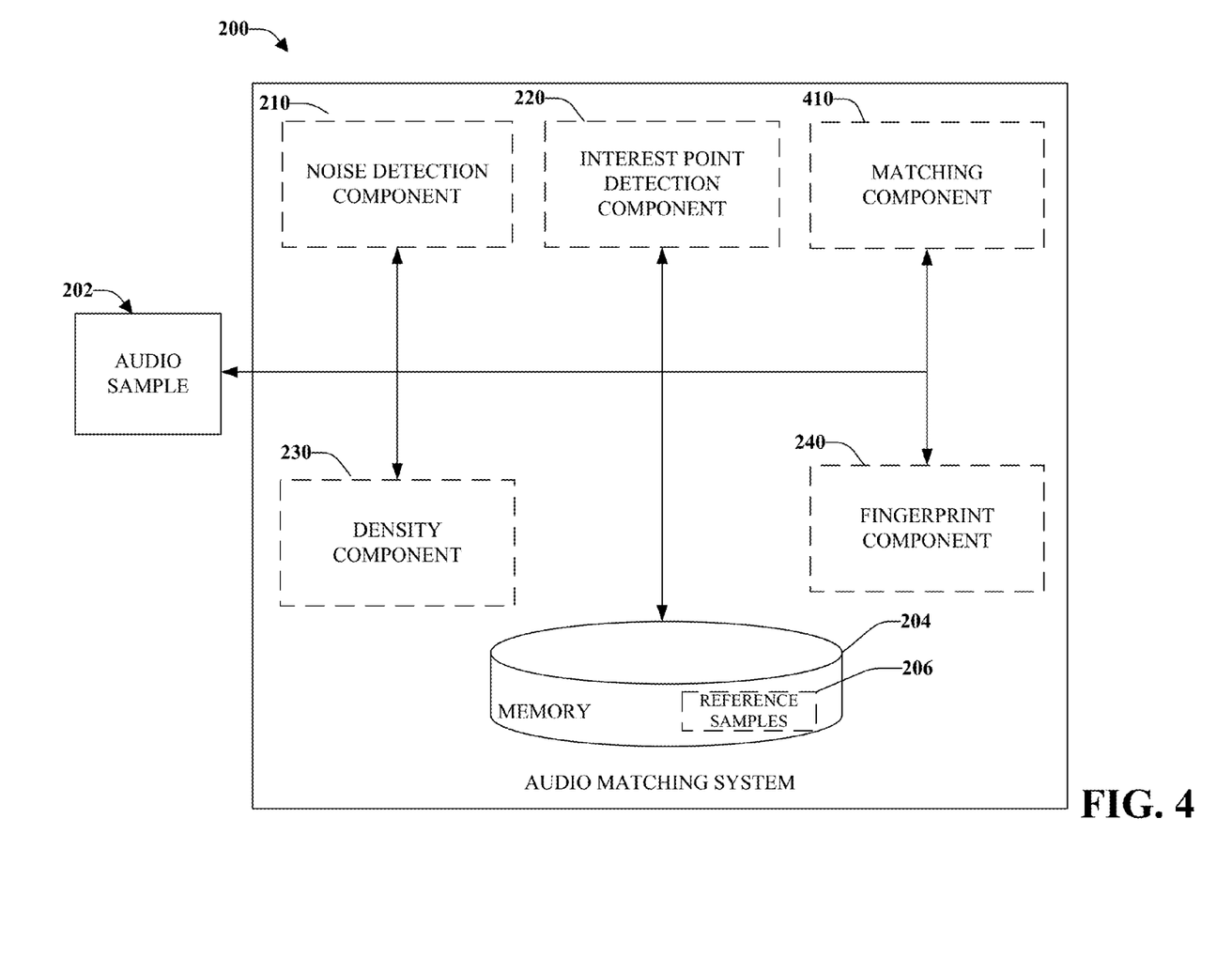
FIG. 4 illustrates a high-level functional block diagram of an example audio matching system using a matching component.

Referring now to FIG. 4, illustrated is a high-level functional block diagram of an example audio matching system 200 including matching component 410 that can identify the audio sample based upon comparing the set of fingerprints generated by fingerprint component 240 for audio sample 202 to reference sample fingerprints 206.

In one implementation, the failure by matching component 410 to identify identity of audio sample 202 can result in increasing the amount of interest points in the set of fingerprints of audio sample 202 generated by fingerprint component 240. It can be appreciated that after increasing the amount of interest points in the set of fingerprints, matching component 410 can reattempt to identify audio sample 202.

Figure 5:
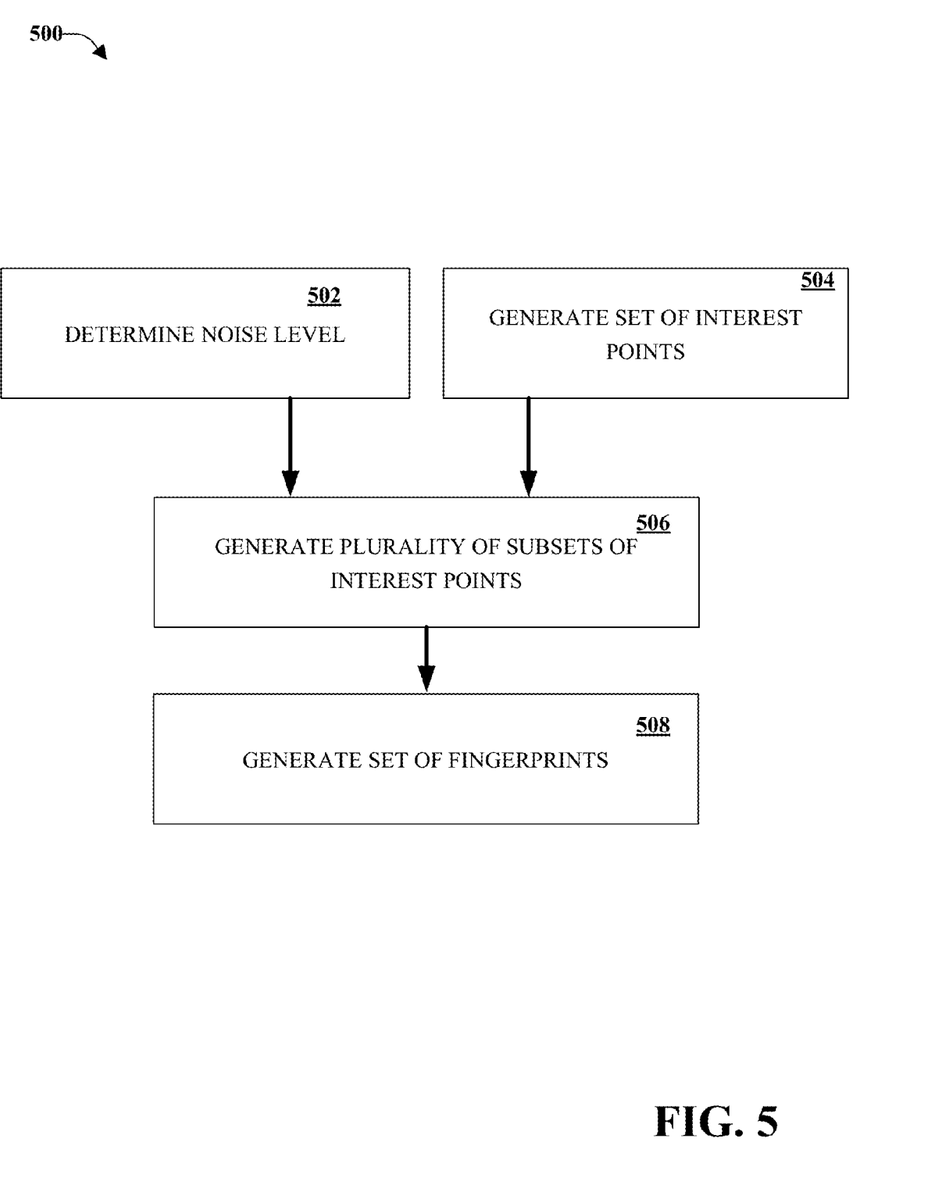
FIG. 5 illustrates an example methodology for noise based interest point density pruning for fingerprinting.
Figure 6:
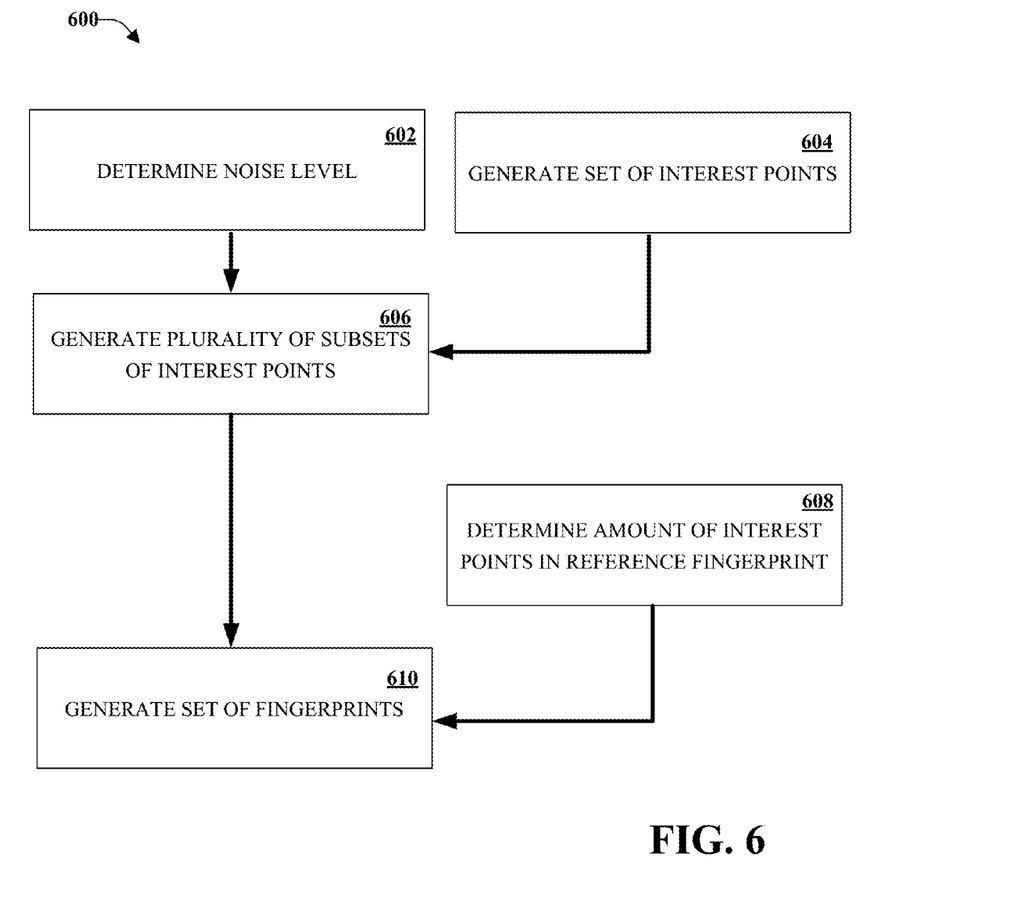
FIG. 6 illustrates an example methodology for noise based interest point density pruning adjusting for reference fingerprint data.
Figure 7:
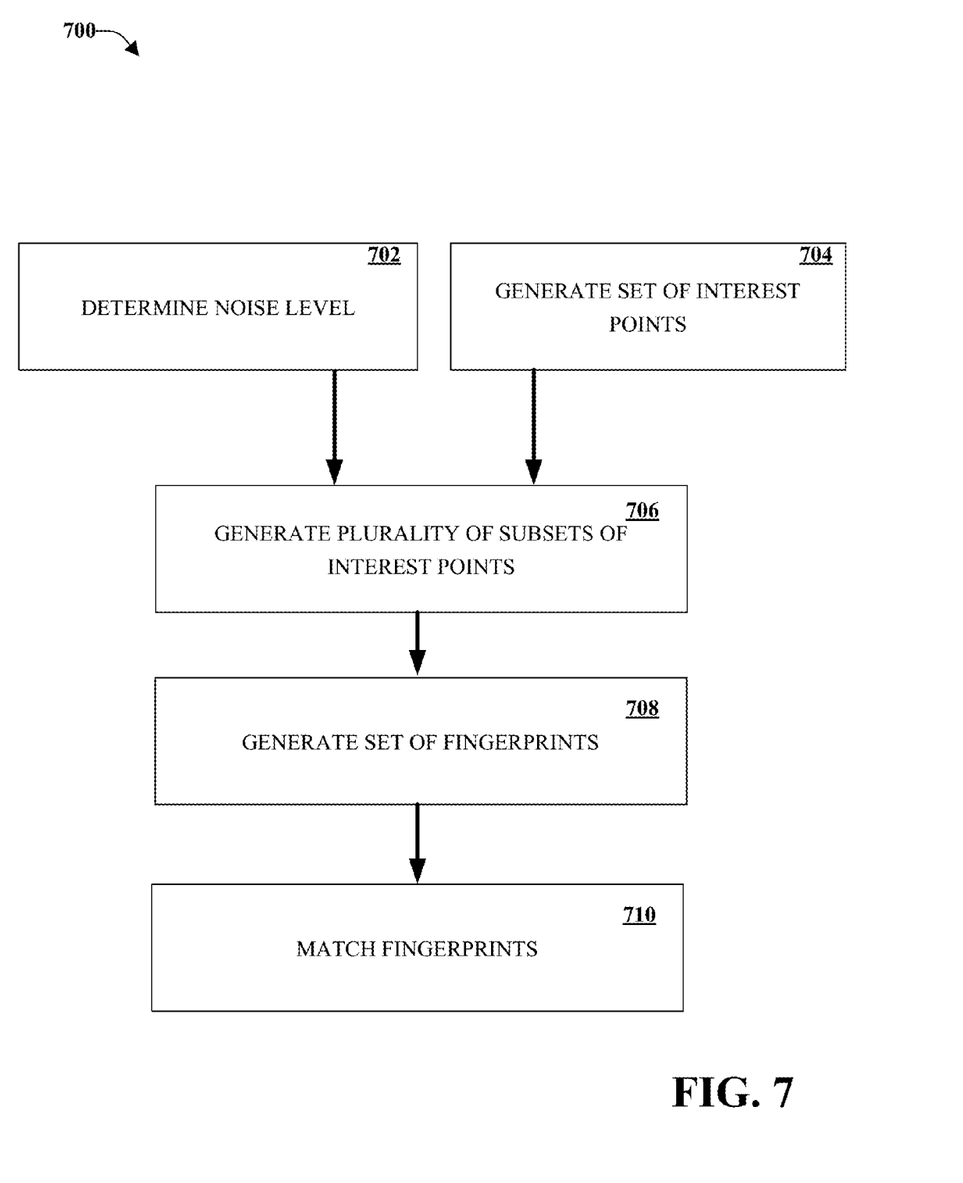
FIG. 7 illustrates an example methodology for audio matching using noise based interest point density pruning.

FIGS. 5-7 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

FIG. 5 illustrates an example methodology 500 for noise based interest point density pruning for fingerprinting. At 502, a noise level is determined (e.g., by a noise detection component) for an audio sample. It can be appreciated that determining the noise can be based on a source of the audio sample.

At 504 a set of interest points is generated (e.g., by an interest point detection component) for the audio sample. At 506, a plurality of subsets interest points are generated (e.g., by a density component) based on the set of interest points for the audio sample. For example, the method can provide for generating a subset of interest points based on interest point detection methods most robust to pitch shift distortion. In another example, the method can provide for generating a subset of interest points based on interest point detection methods most robust to noise introduced by compression techniques. It can be appreciated that the plurality of subsets of interest points generated at 506 can be based on interest point detection methods, random selection, or using a trained classifier.

At 508, a set of fingerprints is generated (e.g., by a fingerprint component) containing an amount of interest points based upon the subset of interest points and the noise level (e.g., pruned based on the noise level). In one implementation, the amount of interest points in the set of fingerprints can be determined based upon comparing the set of fingerprints with reference fingerprints. In one implementation, a high noise level can be assumed and the amount of interest points in the set of fingerprints can be a constant large (e.g., high density) subset of interest points. In one implementation, the amount of interest points in the set of fingerprints increases as noise level increases. In one implementation, the amount of interest points in the set of fingerprints is determined based upon a trained classifier.

FIG. 6 illustrates an example methodology 600 for noise based interest point density pruning adjusting for reference fingerprint data. At 602, a noise level is determined (e.g., by a noise detection component) for an audio sample. At 604, a set of interest points is generated (e.g. by an interest point detection component) for the audio sample. At 606, a plurality of subsets interest points are generated (e.g., by a density component) based on the set of interest points for the audio sample. At 608, an amount of interest points within a reference fingerprint can be determined (e.g., by a reference sample component). At 610, a set of fingerprints is generated (e.g., by a fingerprint component) containing an amount of interest points based upon the subset of interest points and the noise level. Generating the set of fingerprints can be further based on the amount of interest points within the reference fingerprint. In one implementation the amount of interest points in the set of fingerprints is greater than the amount of interest points within the reference fingerprint.

FIG. 7 illustrates an example methodology 700 for audio matching using noise based interest point density pruning. At 702, a noise level is determined (e.g., by a noise detection component) for an audio sample. At 704, a set of interest points is generated for the audio sample (e.g., by an interest point detection component). At 706, a plurality of subsets interest points are generated (e.g., by a density component) based on the set of interest points for the audio sample. At 708, a set of fingerprints is generated (e.g., by a fingerprint component) containing amount of interest points based upon the subset of interest points and the noise level. At 710, the sample can be identified (e.g., by a matching component) by comparing the set of fingerprints with reference fingerprints. In one implementation, the method can provide for comparing the set of fingerprints with reference fingerprints and if the sample is not identified, the density of the subset of interest points included in the set of fingerprints can be increased. In one implementation, the methodology provides from performing successive comparisons between the set of fingerprints and reference fingerprints with an increasing density of interest points in successive lookups until the audio sample is identified.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 8:
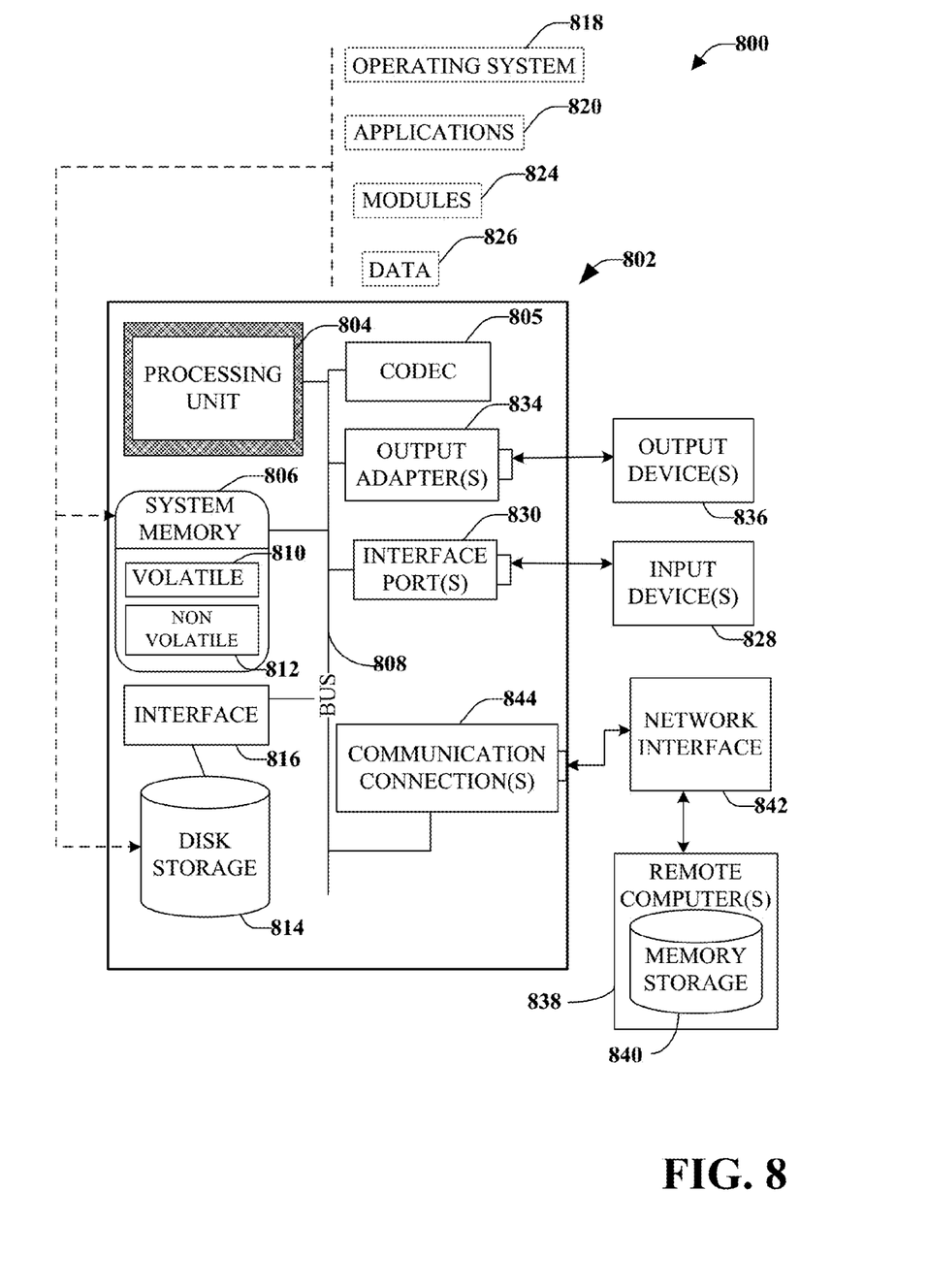
FIG. 8 illustrates an example schematic block diagram for a computing environment in accordance with the subject specification.

With reference to FIG. 8, a suitable environment 800 for implementing various aspects of the claimed subject matter includes a computer 802. The computer 802 includes a processing unit 804, a system memory 806, a codec 805, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 802 may also include removable/non-removable, volatile/non-volatile computer storage media. FIG. 8 illustrates, for example, a disk storage 814. Disk storage 814 includes, but is not limited to, devices like a magnetic disk drive, solid state disk (SSD) floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802, and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
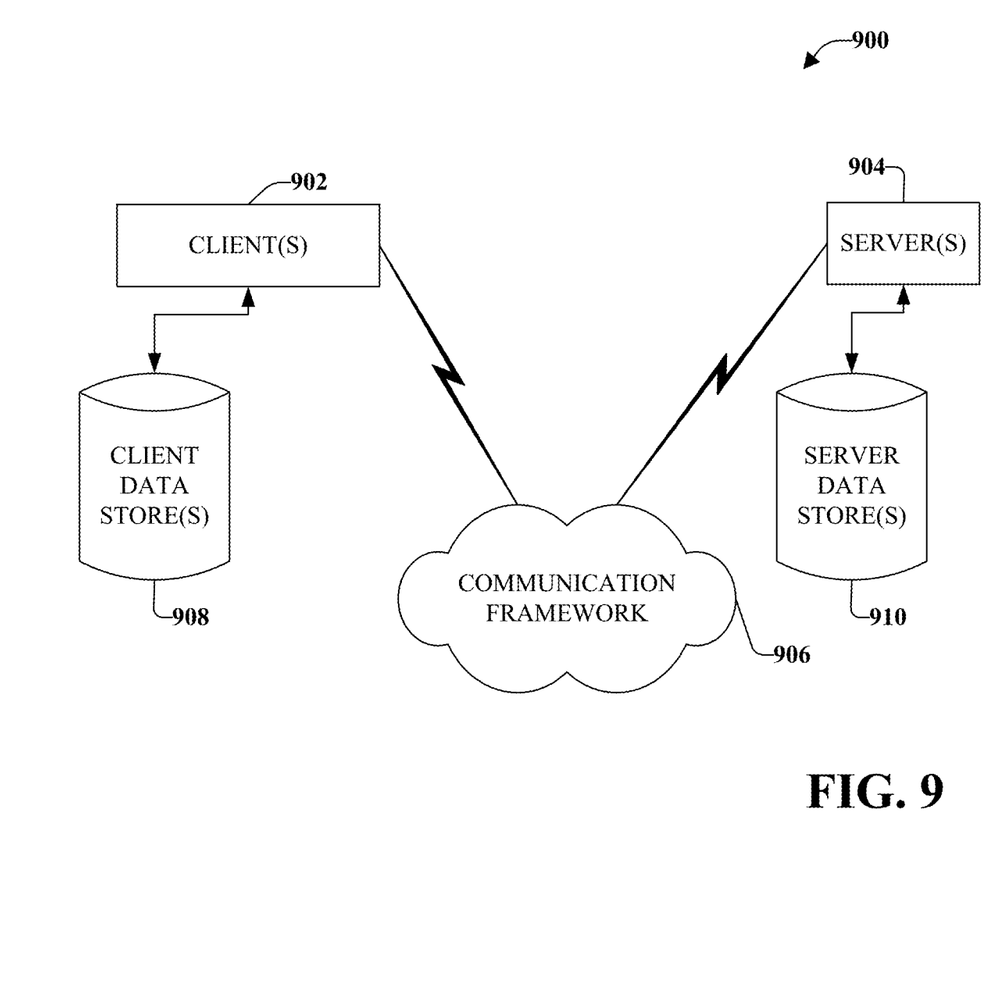
FIG. 9 illustrates an example block diagram of a computer operable to execute the disclosed architecture.

Referring now to FIG. 9, there is illustrated a schematic block diagram of a computing environment 900 in accordance with the subject specification. The system 900 includes one or more client(s) 902, which can include an application or a system that accesses a service on the server 904. The client(s) 902 can be hardware and/or software (e.g., threads, processes, computing devices). The client(s) 902 can house cookie(s), metadata, and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform, for example, interest point detection, density pruning, fingerprint generation, fingerprint matching, or fingerprint comparisons in accordance with the subject disclosure. One possible communication between a client 902 and a server 904 can be in the form of a data packet adapted to be transmitted between two or more computer processes where the data packet contains, for example, an audio sample. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising:
   a processor; and
   a memory communicatively coupled to the processor, the memory having stored therein computer executable components comprising:
   a noise detection component that determines a noise level in an audio sample based upon a determination of a source device of the audio sample and an association of the source device to a corresponding noise level;
   an interest point detection component that generates a set of interest points for the audio sample;
   a density component that selects a subset of the interest points, wherein an amount of the interest points to include in the subset is determined as a function of the noise level, the amount of interest points to include in the subset increases as the noise level increases; and
   a fingerprint component that generates a set of sample fingerprints for the audio sample based on the subset of the interest points.

2. The system of claim 1, wherein the association of the source device to the corresponding noise level is determined based upon whether the source device is expected to have recorded the audio sample or expected to have obtained the audio sample from a storage library.

3. The system of claim 2, wherein the expectation to have recorded the audio sample is indicative of associated with a high noise level.

4. The system of claim 2, wherein the expectation to have obtained the audio sample from a storage library is associated with a low noise level.

5. The system of claim 1, wherein the source device of the audio sample includes at least one of a phone, a tablet, a personal digital assistant, a server, a personal computer, or a media player.

6. The system of claim 1, further comprising a matching component that:
   determines whether there is a reference sample in a set of reference samples that matches the audio sample based upon comparing the set of sample fingerprints with respective sets of reference fingerprints associated with the set of reference samples.

7. The system of claim 6, wherein the amount of interest points in the set of sample fingerprints is greater than the amount of interest points in respective reference fingerprints in the set of reference fingerprints.

8. A method, comprising:
identifying, by a system including a processor, a noise level in an audio sample based upon a determination of a source device of the audio sample and an association of the source device to a corresponding noise level;
creating, by the system, a set of interest points for the audio sample;
selecting, by the system, a subset of the interest points, wherein an amount of the interest points to include in the subset is determined as a function of the noise level, the amount of interest points to include in the subset increases as the noise level increases; and
creating, by the system, a set of sample fingerprints for the audio sample based on the subset of the interest points.

9. The method of claim 1, wherein the association of the source device to the corresponding noise level is determined based upon whether the source device is expected to have recorded the audio sample or expected to have obtained the audio sample from a storage library.

10. The method of claim 9, wherein the expectation to have recorded the audio sample is indicative of associated with a high noise level.

11. The method of claim 9, wherein the expectation to have obtained the audio sample from a storage library is associated with a low noise level.

12. The method of claim 8, wherein the source device of the audio sample includes at least one of a phone, a tablet, a personal digital assistant, a server, a personal computer, or a media player.

13. The method of claim 8, further comprising a matching component that:
determining, by the system, whether there is a reference sample in a set of reference samples that matches the audio sample based upon comparing the set of sample fingerprints with respective sets of reference fingerprints associated with the set of reference samples.

14. The method of claim 13, wherein the amount of interest points in the set of sample fingerprints is greater than the amount of interest points in respective reference fingerprints in the set of reference fingerprints.

15. A non-transitory computer-readable medium having instructions stored thereon that, in response to execution, cause a system including a processor to perform operations comprising:
ascertaining a noise level in an audio sample based upon a determination of a source device of the audio sample and an association of the source device to a corresponding noise level;
producing a set of interest points for the audio sample;
selecting a subset of the interest points, wherein an amount of the interest points to include in the subset is determined as a function of the noise level, the amount of interest points to include in the subset increases as the noise level increases; and
producing a set of sample fingerprints for the audio sample based on the subset of the interest points.

16. The non-transitory computer-readable medium of claim 15, wherein the association of the source device to the corresponding noise level is determined based upon whether the source device is expected to have recorded the audio sample or expected to have obtained the audio sample from a storage library.

17. The non-transitory computer-readable medium of claim 16, wherein the expectation to have recorded the audio sample is indicative of associated with a high noise level.

18. The non-transitory computer-readable medium of claim 16, wherein the expectation to have obtained the audio sample from a storage library is associated with a low noise level.

19. The non-transitory computer-readable medium of claim 15, wherein the source device of the audio sample includes at least one of a phone, a tablet, a personal digital assistant, a server, a personal computer, or a media player.

20. The non-transitory computer-readable medium of claim 15, further comprising a matching component that:
determining, by the system, whether there is a reference sample in a set of reference samples that matches the audio sample based upon comparing the set of sample fingerprints with respective sets of reference fingerprints associated with the set of reference samples.

* * * * *